(12) United States Patent
Astill (10) Patent No.: US 8,059,948 B2
(45) Date of Patent: Nov. 15, 2011

(54) PHOTOGRAPHIC APPARATUS (75) Inventor: Gary James Astill, Leicestershire (GB)

(73) Assignee: Lastolite Limited, Coalville, Leicestershire (GB)

( * ) Notice: Subject to any disclaimer, the term of this patent is extended or adjusted under 35 U.S.C. 154(b) by 321 days.

(21) Appl. No.: 12/441,739

(22) PCT Filed: Sep. 20, 2007

(86) PCT No.: PCT/GB2007/050564
§ 371 (c)(1),
(2), (4) Date: Mar. 18, 2009

(87) PCT Pub. No.: WO2008/035118
PCT Pub. Date: Mar. 27, 2008

(65) Prior Publication Data
US 2009/0269045 A1      Oct. 29, 2009

(30) Foreign Application Priority Data
Sep. 22, 2006    (GB) .................................. 0618614.2

(51) Int. Cl.
*G03B 15/00* (2006.01)
*G03B 15/02* (2006.01)
*H04N 5/222* (2006.01)
(52) U.S. Cl. ..................... 396/3; 396/4; 362/3; 348/722
(58) Field of Classification Search ................. 396/3, 1, 396/2, 4, 5; 348/722; 362/3
See application file for complete search history.

(56) References Cited

U.S. PATENT DOCUMENTS

| 5,154,503 | A | 10/1992 | Sternsher |
| 6,947,666 | B2 * | 9/2005 | Chapman et al. ................. 396/4 |
| 2006/0114356 | A1 | 6/2006 | Didow et al. |

FOREIGN PATENT DOCUMENTS

| EP | 0 225 105 A2 | 6/1999 |
| EP | 0 961 161 A2 | 12/1999 |

* cited by examiner

Primary Examiner — Rochelle-Ann J Blackman
(74) Attorney, Agent, or Firm — Young Basile (57) ABSTRACT

A method of photographing an object (50,52) and associated photographic apparatus are disclosed. A camera (60), a light source (40) and a collapsible background unit (10,90) are provided, wherein the collapsible background unit (10,90) comprises an enclosure with an illuminating wall (18,95) that is translucent. The light source (40) and the background unit (10,90) are arranged relative to each other so that light from the light source (40) is directed into the interior of the enclosure, at least some of said light being transmitted to the exterior of the enclosure through the illuminating wall (18, 95). The object (50,52) and the camera (60) are arranged externally of the enclosure such that the illuminating wall (18,95), or an additional translucent component (74) interposed between the illuminating wall (18,95) and the object (50,52), constitutes a background for the object (50,52). A photograph of the object (50,52) is then taken using the camera (60).

17 Claims, 7 Drawing Sheets

PHOTOGRAPHIC APPARATUS

This invention relates to photographic apparatus, and in particular photographic apparatus for providing an illuminated background for an object being photographed.

Photographers often wish to photograph objects against a featureless background, and typically use either one or more rigid panels, or one or more sheets of flexible material, to provide such a background. It is also known to provide a background that is illuminated to a sufficient extent for the background to be over-exposed in the photograph, and hence appear as an entirely featureless pure white background in the photograph.

However, a disadvantage associated with conventional apparatus is that the rigid panels and/or the sheets of flexible material that form the background, and also the plurality of light sources normally required to illuminate the background, are time-consuming to erect and arrange in such a way that the background is illuminated to a sufficient degree across its entire surface. Furthermore, since the background must be illuminated without any shadows being formed on its surface, the object being photographed needs to be situated a considerable distance in front of the background, which is clearly inconvenient if space is limited.

Apparatus has been developed that comprises a stand having a transparent plastics support wall with an upper surface that is generally concave and hence defines both a support surface and a background for the object being photographed. The apparatus further includes a light source that directly illuminates the underside of the transparent support wall, and hence illuminates the support surface and the background for the object being photographed. However, a major disadvantage associated with this apparatus is that the stand is necessarily rather large and rigid in form, and hence not readily transportable. Furthermore, since the light source and support surface must be situated directly below the object being photographed, this apparatus is generally not suitable for photographing larger objects, such as people or cars.

There has now been devised an improved method and improved apparatus for photographing an object which overcome or substantially mitigate the above-mentioned and/or other disadvantages associated with the prior art.

According to a first aspect of the invention, there is provided a method of photographing an object, which method comprises the steps of
(a) providing a camera, a light source and a collapsible background unit comprising an enclosure with an illuminating wall that is translucent,
(b) arranging the light source and the background unit relative to each other so that light from the light source is directed into the interior of the enclosure, at least some of said light being transmitted to the exterior of the enclosure through the illuminating wall,
(c) arranging the object and the camera externally of the enclosure such that the illuminating wall, or an additional translucent component interposed between the illuminating wall and the object, constitutes a background for the object, and
(d) taking a photograph of the object using the camera.

According to a further aspect of the invention, there is provided apparatus for photographing an object, the apparatus comprising a camera, a collapsible background unit comprising an enclosure with an illuminating wall that is translucent, and a light source arranged relative to the background unit so that light from the light source is directed into the interior of the enclosure, the illuminating wall being adapted to transmit at least some of said light to the exterior of the enclosure, and the camera and the object being arranged externally of the enclosure such that the illuminating wall, or an additional translucent component interposed between the illuminating wall and the object, constitutes a background for the object.

According to another aspect of the invention, there is provided a collapsible background unit for use in association with a light source and a camera for photographing an object, the collapsible background unit comprising an enclosure with an illuminating wall that is translucent, the arrangement being such that when light from a light source is directed into the interior of the enclosure the illuminating wall transmits at least some of said light to the exterior of the enclosure, such that the illuminating wall, or an additional translucent component interposed between the illuminating wall and the object, constitutes a background for the object.

The method and apparatus for photographing an object according to the invention are advantageous principally because they enable a uniformly illuminated background to be achieved with only simple components, including in most cases a single light source, that require much less preparation and arrangement than prior art apparatus. Furthermore, the present invention enables the object being photographed to be situated much closer to the background than with prior art apparatus, without it being necessary for the light source to be located directly below the object.

By "a background for the object" is meant all matter other than the object that is visible in the photograph of that object. The background may therefore extend to the front and rear of the object, as well as above, below and to the side of the object. Preferably, the light transmitted through the illuminating wall that forms the background for the object is of sufficient intensity relative to the exposure settings of the camera for the transmitted light to be over-exposed in the photograph, and hence to appear white and featureless in the photograph.

The background unit is preferably adapted to be self-supporting, and hence be positionable upon a suitable surface, such as a floor, in a free-standing configuration during use. In presently preferred embodiments, the background unit is positionable upon a suitable surface in an upright configuration, in which the illuminating wall is capable of constituting a background for the object.

By "collapsible" is meant that the background unit is reducible in size, most preferably by at least 75%, along at least one dimension. In presently preferred embodiments, the background unit comprises two or more panels connected by a web of flexible material, each panel being adapted to maintain its shape during normal use, and the connecting web being held in tension by a plurality of support struts that extend between the panels. Most preferably, the background unit comprises two panels, and the connecting web preferably extends between the perimeters of the two panels. The support struts are preferably removable, and are preferably adapted at each end to engage a frame of a panel. Most preferably, one of the panels includes the illuminating wall.

The illuminating wall preferably has a uniform partial transparency to visible light, and preferably acts to diffuse visible light that is transmitted therethrough. The illuminating wall preferably therefore has a uniformly illuminated exterior surface. The illuminating wall preferably comprises a sheet of flexible material, and is most preferably held in tension in order to remove any creases or wrinkles. In presently preferred embodiments, the illuminating wall is formed of a woven or knitted fabric. However, in order to facilitate the removal of creases and wrinkles from the illuminating wall, the illuminating wall is preferably formed of an elastic material, and hence is preferably formed of a knitted fabric. Furthermore, the illuminating wall preferably has a smooth external surface, and therefore preferably includes a plastics coating on its external surface. The plastics coating is preferably smooth in form, and is preferably of white colouration. Where a separate translucent component is provided, that component also preferably has a uniform partial transparency to visible light, and preferably acts to diffuse visible light that is transmitted therethrough. The separate translucent component preferably therefore has a uniformly illuminated surface that faces the camera.

The enclosure is preferably adapted to receive light from the light source through an opening in a wall of the enclosure. Where the enclosure includes an opening, the opening may include a closure that enables the size of the opening to be altered. This feature enables the light source to be arranged so that it projects though the opening, with the opening reduced in size to fit closely about the light source, so that the light emitted by the light source is principally directed into the interior of the enclosure, and then transmitted through the illuminating wall. This is advantageous because light from the light source that is not directed into the interior of the enclosure, and then transmitted through the illuminating wall, may be visible to the camera and hence affect the quality of the photograph. In presently preferred embodiments, the opening has the form of a slit, and the closure is a zip closure that is preferably closable from either end of the slit.

Although the enclosure is preferably adapted to receive light from the light source through an opening in a wall of the enclosure, the enclosure may include a translucent wall, in addition to the illuminating wall, through which light from the light source may be directed into the interior of the enclosure. The translucent wall may be provided along with, or in the place of, the opening. Most preferably, the translucent wall acts to diffuse light transmitted therethrough, and has a light transmittance that is less than that of the illuminating wall. In presently preferred embodiments, the connecting web is translucent, but to a significantly less extent than the illuminating wall.

The interior surface of the enclosure is preferably adapted to reflect at least a portion of the light directed into the interior of the enclosure by the light source, so that said light is reflected about the interior of the enclosure before being transmitted through the illuminating wall. A major part of the interior surface of the enclosure is preferably adapted to reflect light incident thereon, and is preferably of white colouration.

In order to achieve uniform transmission of light through the illuminating wall, the illuminating wall may be illuminated principally by light that has been reflected by the interior surface of the enclosure, and hence may be illuminated indirectly by the light source. For this reason, the light source may be directed towards a part of the interior surface of the enclosure other than the illuminating wall, so as not to directly illuminate the illuminating wall. In presently preferred embodiments, the opening is formed in a wall of the enclosure that is arranged generally perpendicularly to the illuminating wall.

The camera is preferably a conventional photographic camera, such as a digital photographic camera. Most preferably, however, the camera is capable of indicating to the photographer when the light intensity of the background is sufficient relative to the exposure settings of the camera for the background to be over-exposed in the photograph. For instance, the camera may be capable of creating an exposure histogram. In order to obtain correct exposure of the object in the photograph, additional light sources are preferably provided for lighting the front surfaces of the object. In particular, an additional background unit may be positioned to one side of the object, out of sight of the camera, and an additional light source may be arranged so that light is directed into the interior of the additional background unit, at least some of said light is transmitted to the exterior of the enclosure through the illuminating wall, and at least some of said transmitted light illuminates the object. The additional background unit may therefore be used as free-standing light-diffusing apparatus.

The illuminating wall is preferably held in tension by a frame so as to form one of the panels of the background unit. In particular, the frame is preferably resilient, and preferably comprises a fabric tube to which the illuminating wall is fixed and a resilient hoop accommodated within the fabric tube. In presently preferred embodiments, the illuminating enclosure comprises first and second panels, with the first panel including the illuminating wall. The connecting web preferably extends between the frames of the two panels.

The connecting web may be formed of any suitably flexible material, such as a woven or knitted fabric or a plastics material such as polyvinylchloride (PVC). However, in presently preferred embodiments, the connecting web is formed of a knitted fabric, which may include a plastic coating on its exterior surface. The illuminating enclosure is preferably defined by the first and second panels and the connecting web, and the opening in the illuminating enclosure is preferably formed in the connecting web.

Each support strut may include a notch at each end that is adapted to receive an edge of the frame of a panel. Alternatively, the ends of each support strut may be adapted to be received within recesses in the frames of the panels. Most preferably, the background unit includes at least four support struts that are spaced generally equidistantly about the perimeter of the enclosure.

In a presently preferred arrangement, the object is positioned directly in front of the illuminating wall, externally of the enclosure, such that the illuminating wall forms a background for the object being photographed. In this case, the background unit preferably rests upon adjacent edges of the two panels, and hence is free-standing in an upright configuration. The opening is preferably situated so that the light source can be readily positioned to direct light through the opening, but the opening is most conveniently situated on one side of the background unit. The object or objects are preferably positioned within 2 m, and most preferably within 1 m, of the illuminating wall. The illuminating wall preferably has sufficiently large dimensions for the illuminating wall to constitute the entire background for the object, and hence the illuminating wall preferably has a length and/or width of at least 1.2 m. The apparatus is preferably arranged so that the light intensity of the background is sufficient relative to the exposure settings of the camera for the background to be over-exposed in the photograph.

In another presently preferred arrangement, the illuminating wall is situated beneath the object to be photographed. In this case, the background unit may form a support for the object, and hence preferably includes a rigid support member for providing the background unit with additional rigidity. In particular, a transparent plastics sheet is preferably engaged with the frame of the uppermost panel, and is most preferably received within the frame of that panel with an interference fit. In addition, the frame of each panel preferably has sufficient strength for the background unit to be able to support the object during use.

Where the illuminating wall is situated beneath the object being photographed, a separate translucent component is preferably arranged so that it is illuminated by light transmitted by the illuminating wall and forms a background for the object. The translucent component preferably extends both below and behind the object, and is most preferably curved with a generally concave upper surface. The apparatus is preferably arranged so that the light intensity of the background is sufficient relative to the exposure settings of the camera for the background to be over-exposed in the photograph. In order to facilitate collapse of the apparatus, the translucent component is preferably flexible.

Furthermore, a housing for providing featureless surroundings for the object may be provided. In particular, the housing is preferably arranged so as to surround the object or objects, but preferably includes a front opening through which a photograph is taken. The front opening may include a closure that is adjustable in size, such as a zip closure. The walls of the housing are preferably translucent, so that light transmitted therethrough is diffused. In addition, the housing preferably has an open lower end so that the translucent component receives sufficient light from the illuminating wall, and also so that the housing may be placed over the object or objects. The translucent component is preferably mounted within housing, and hence the housing preferably includes fasteners at an upper end of a rear wall of the housing for that purpose. In order to obtain correct exposure of the object or objects in the photograph, additional light sources are preferably provided for lighting the front surfaces of the object through the walls of the housing.

In a particularly preferred embodiment, the collapsible background unit preferably includes a housing for providing featureless surroundings for the object. In particular, the background unit preferably comprises a central panel including the illuminating wall, and upper and lower panels. A connecting web and associated support struts preferably extend between the upper panel and the central panel so as to define the housing, and a connecting web and associated support struts preferably extend between the lower panel and the central panel so as to define the enclosure.

The collapsible background unit according to the invention may also be used without the light source, so that the illuminating wall is not illuminated from within the background unit, and hence constitutes a non-illuminated background for the object being photographed. Furthermore, the background unit may be suitable for acting as a free-standing support for a separate background component. For instance, the separate background component may be a flexible sheet of material, or a panel having a sheet of flexible material held in tension by a resilient frame. In this case, the background unit may be adapted to engage with the separate background component, and hence may include releasable fasteners, such as hook-and-loop fasteners, so that the separate background component is held in a generally upright configuration. Clearly, for these applications, the collapsible background unit does not require an illuminating wall that is translucent, and hence may have opaque walls.

Hence, according to a related aspect of the invention, there is provided a collapsible background unit comprising two or more substantially rectangular panels connected by a web of flexible material, each panel being adapted to maintain its shape during normal use, and the connecting web being held in tension by a plurality of removable support struts that extend between the panels.

The background unit is preferably adapted to be self-supporting, and hence positionable upon a suitable surface, such as a floor, in a free-standing configuration during use.

By "substantially rectangular" is meant that each panel has four straight sides that define parts of the same rectangle, but each panel may have rounded corners. In this way, each panel of the background unit is a suitable shape for constituting, or alternatively supporting, a background for an object being photographed. Furthermore, the straight sides of the panels are preferably suitable for forming one or more bases upon which the background unit may rest in its free-standing configuration.

The background unit preferably comprises two panels, and the connecting web preferably extends between the perimeters of the two panels. Each panel preferably comprises a sheet of flexible material that is held in tension by a frame. In particular, the frame is preferably resilient, and preferably comprises a fabric tube to which the sheet of flexible material is fixed and a resilient hoop accommodated within the fabric tube. In presently preferred embodiments, the background unit comprises first and second panels, and the connecting web preferably extends between the frames of the two panels. The support struts are preferably adapted at each end to engage a frame of a panel.

Where the background unit comprises two panels, the panels are preferably orientated parallel to each other, and preferably have substantially the same size and shape. In this way, the background unit is preferably adapted to be self-supporting upon a base defined by adjacent straight sides of the two panels. Most preferably, the background unit comprises two bases that are orientated generally orthogonally to each other, such that the background unit is positionable upon a suitable surface in at least two orientations.

The background unit according to the invention may form part of apparatus for photographing an object so that at least part of one of the panels constitutes a non-illuminated background for the object. Furthermore, the background unit may be used as a free-standing support for a separate background component. For instance, the separate background component may be a flexible sheet of material, or a panel having a sheet of flexible material held in tension by a resilient frame. In this case, the background unit may be adapted to engage with the separate background component, and hence may include releasable fasteners, such as hook-and-loop fasteners, so that the separate background component is held in a generally upright configuration.

The sheets of flexible material of the panels and the connecting web may be formed of any suitably flexible material, such as a woven or knitted fabric or a plastics material such as polyvinylchloride (PVC). However, where the background unit is intended for use so that at least part of one of the panels constitutes a non-illuminated background for an object being photographed, the sheet of flexible material for that panel is preferably formed of an elastic material, for example a knitted fabric, in order to facilitate the removal of creases and wrinkles from the sheet of flexible material that constitutes the background.

Preferred embodiments of the invention will now be described in greater detail, by way of illustration only, with reference to the accompanying drawings, in which.

Figure 1:
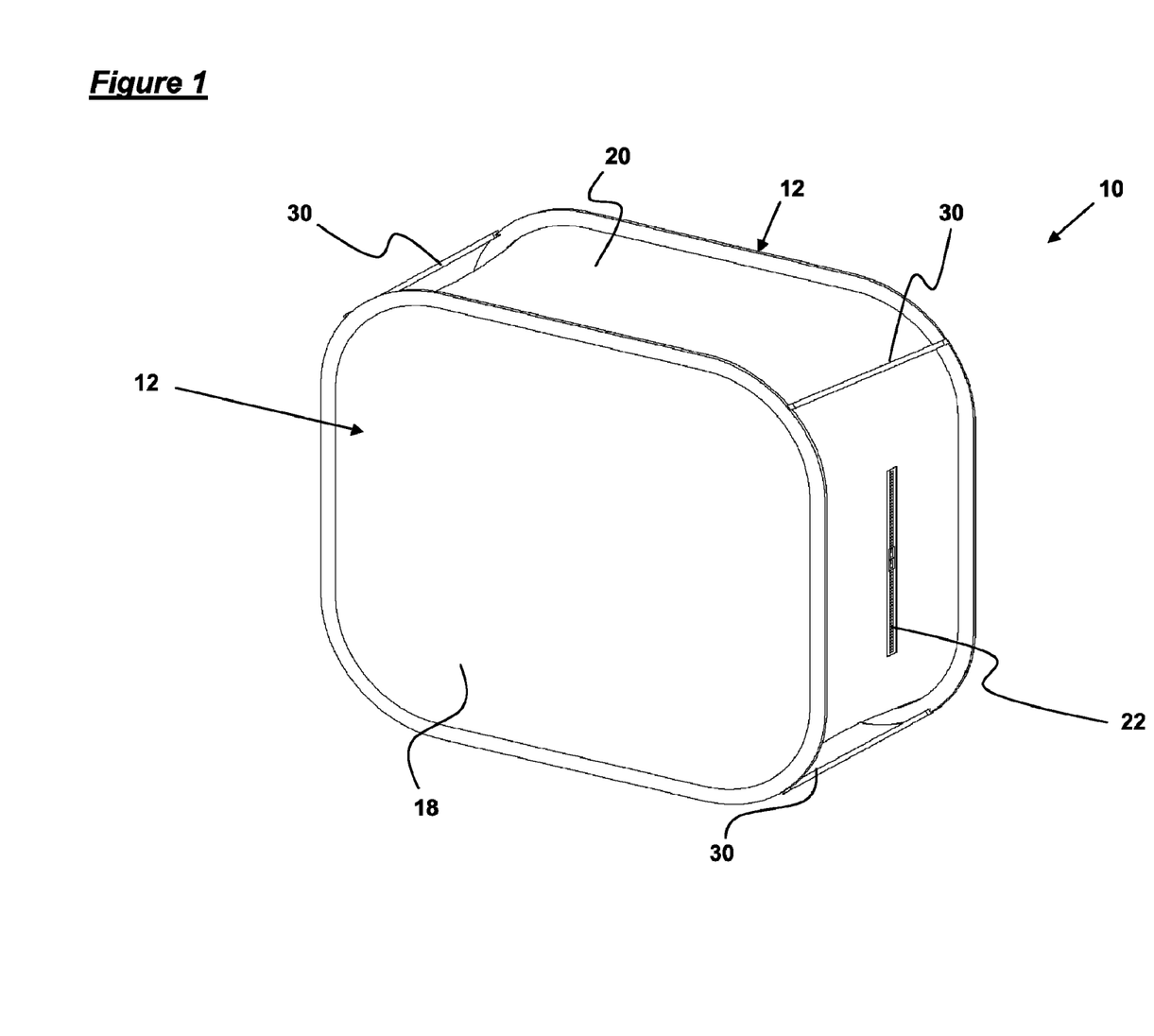
FIG. 1 is a perspective view of a first embodiment of a background unit according to the invention, in its erected configuration, which forms part of first and second embodiments of apparatus according to the invention.

FIG. 1 shows a first embodiment of a background unit according to the invention, which is generally designated 10 and forms part of first and second embodiments of the apparatus according to the invention. The background unit 10 comprises a pair of identical panels 12, a connecting web 20, and four support struts 30 (only three of which are visible in FIG. 1). The panels 12 and the connecting web 20 together define an enclosure of the background unit 10.

Each panel 12 comprises a sheet of flexible material that is mounted within a resilient frame. The sheet of flexible material of one of the panels 12 is formed of a knitted fabric having a white colouration, with an elastomeric coating of white colouration on its external surface, and defines an illuminating wall 18. The illuminating wall 18 is adapted to transmit light from the interior of the background unit 10 to its exterior. The sheet of flexible material of the other panel 12 is substantially opaque.

Figure 3:
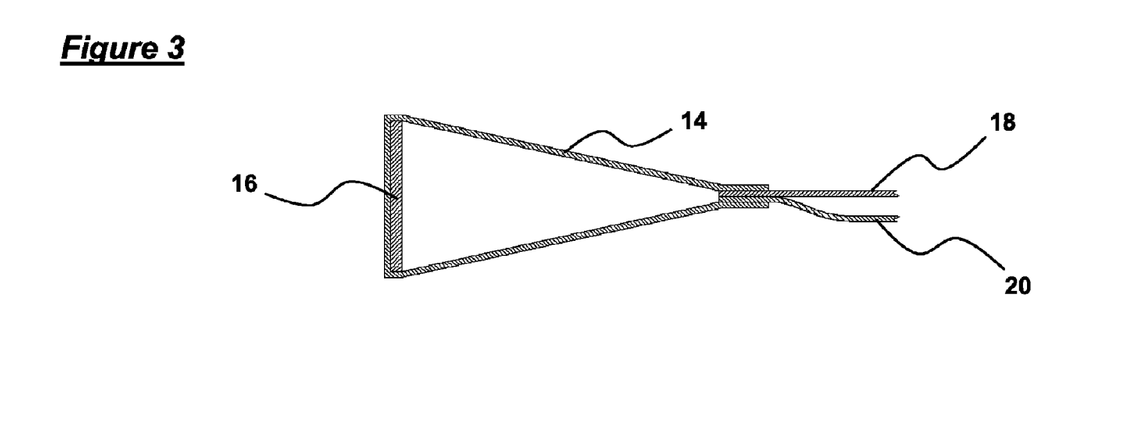
FIG. 3 is a fragmentary cross-sectional view along the line III-III in FIG. 2.

The frame is shown in more detail in FIG. 3, and comprises a fabric tube 14 stitched to the periphery of both the sheet of flexible material and one end of the connecting web 20, and a resilient hoop 16 within the fabric tube 14 that acts to maintain the sheet of flexible material of the panel 12 in a slightly stretched state. The hoop 16 is typically formed from a band of carbon spring steel having a width of about 10 mm and the ends of which are clipped, welded or riveted together to form the hoop. The sheets of flexible material, including illuminating wall 18, are shaped so that each panel 12 is generally rectangular in shape, but with rounded corners, and the illuminating wall 18 is free from wrinkles and creases.

The connecting web 20 is formed of knitted fabric that is of white colouration, and has an elastomeric coating of black colouration on its external surface. The connecting web 20 extends between the frames of the panels 12. On one side of the background unit 10, the connecting web 20 includes an opening having the form of a slit in the connecting web 20. The opening in the connecting web 20 is variable in size by means of a zip closure 22 that is closable from either end of the opening by means of a pair of zips.

The background unit 10 also includes four removable support struts 30 (only three of which are visible in FIG. 1) that each extend between opposed parts of the frames of the panels 12, and are situated externally of the connecting web 20. Each support strut 30 has a notch at each end, with each notch receiving part of an inner edge of the resilient hoop 16 and the associated parts of the fabric tube 14. The support struts 30 are spaced approximately equidistantly around the external surface of the connecting web 20, and act to slightly stretch the fabric of the connecting web 20.

Figure 2:
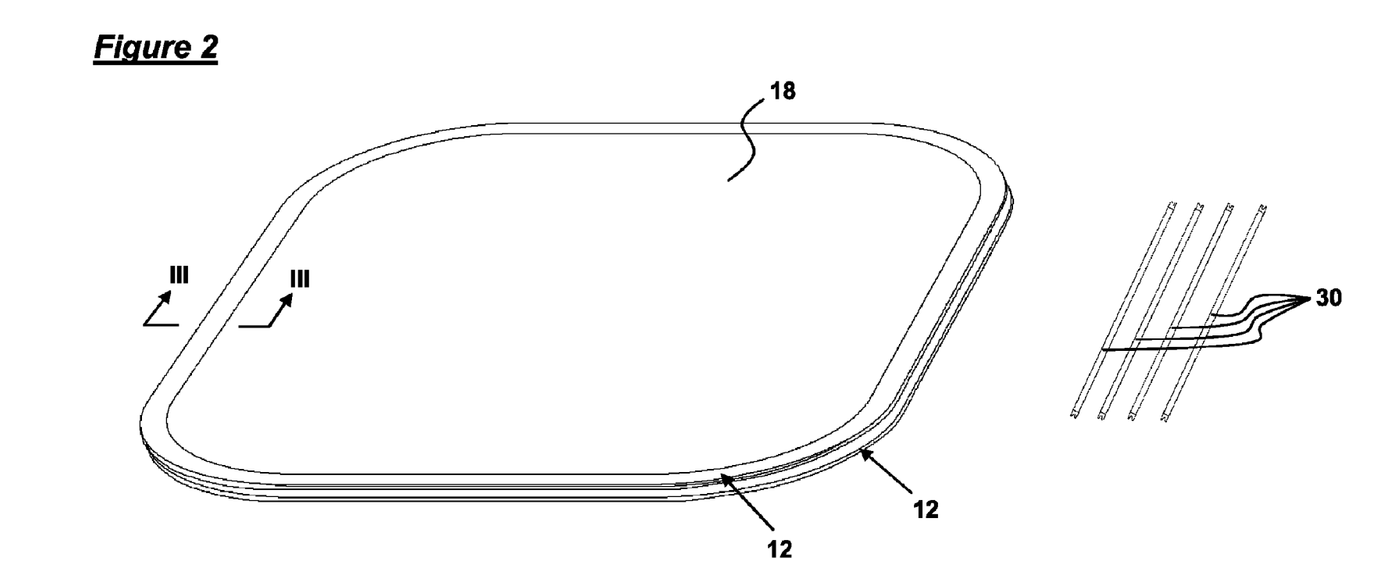
FIG. 2 is a perspective view of the background unit of FIG. 1 in its collapsed configuration.

With the support struts 30 engaged, as shown in FIG. 1, the background unit 10 has the form of a box that retains its shape during use. When the background unit 10 is no longer needed, it can be collapsed by removing the support struts 30. In particular, the support struts 30 are removed by increasing the separation of the panels 12 slightly, and hence causing additional stretching of the fabric of the connecting web 20, and then removing the resilient hoops 16 from the notches of the support struts 30. Once the support struts 30 have been disengaged from the panels 12, the background unit 10 may be collapsed into the configuration shown in FIG. 2. In this configuration, the panels 12 lie alongside one another, with the connecting web 20 folded between the panels 12. If desired, the background unit 10 may then be collapsed further by grasping opposite sides of the folded panels 12 and twisting the folded panels 12 to form loops which can then be folded over.

The background unit 10, when in its erected configuration, is adapted to be used with a light source 40 so as to provide an illuminated background for an object being photographed. In particular, light directed through the opening in the connecting web 20 into the interior of the background unit 10 is reflected in all directions by the interior surface of the background unit 10, and transmitted through the illuminating wall 18. The illuminating wall 18 therefore becomes illuminated, and hence either provides an illuminated background for an object to be photographed or acts to illuminate a separate translucent sheet to form an illuminated background. The illuminated background may be situated behind, above, below or to the side of the object, and particular embodiments of the apparatus according to the invention are discussed in more detail below.

Figure 4:
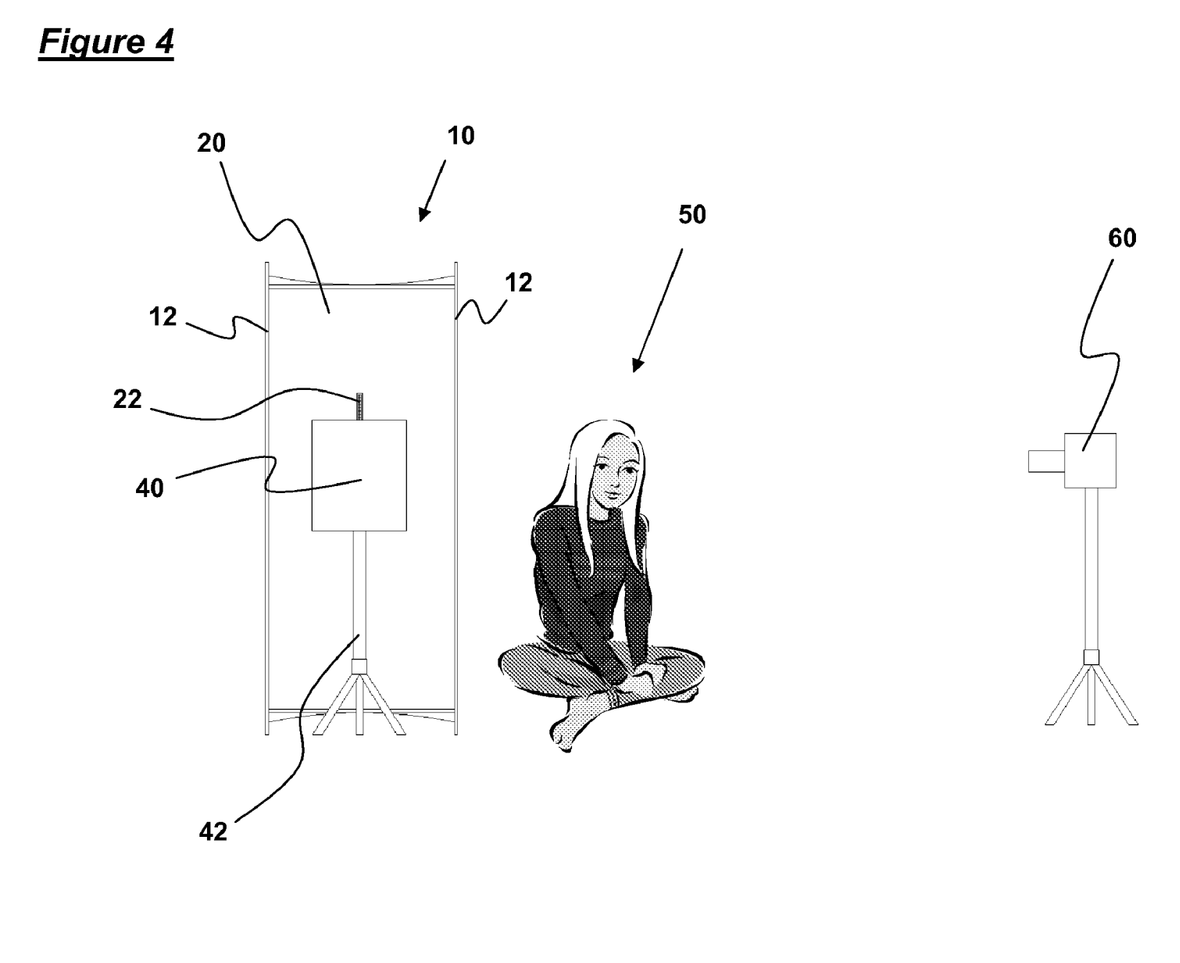
FIG. 4 is a side view of a first embodiment of apparatus according to the invention, in which a person is being photographed.

Referring now to FIG. 4, a first embodiment of apparatus according to the invention is shown. The apparatus comprises the background unit 10 described above, a light source 40 and a photographic camera 60.

The background unit 10 rests upon adjacent edges of the panels 12 so that the panels 12 are orientated substantially vertically, and the opening in the connecting web 20 is situated on one side of the background unit 10. The light source 40 is mounted on a stand 42 having an adjustable height, and the light source 40 is arranged so that it projects through the opening in the connecting web 20. The zip closure 22 is closed about the light source 40 with a relatively close fit so that light emitted by the light source 40 is directed through the opening in the connecting web 20 into the interior of the background unit 10. In particular, the light source 40 is arranged so that light is directed principally towards the interior surfaces of the connecting web 20 and the substantially opaque panel 12.

The subject 50 of the photograph to be taken, which is in the illustrated case a person, is positioned directly in front of the illuminating wall 18 of the background unit 10. The camera 60 is arranged so that the exterior surface of the illuminating wall 18 forms the background of the photograph to be taken. The intensity of the light emitted by the light source 40 needs to be sufficient for the illuminating wall 18 to be illuminated to such an extent, relative to the exposure settings of the camera 60, that the illuminating wall 18 is over-exposed in the photograph. Additional light sources (not shown in the Figures) may also be used to illuminate the subject 50 directly. Once the photographer is happy that the illuminating wall 18 is sufficiently over-exposed, a photograph is taken by the camera 60.

Figure 5:
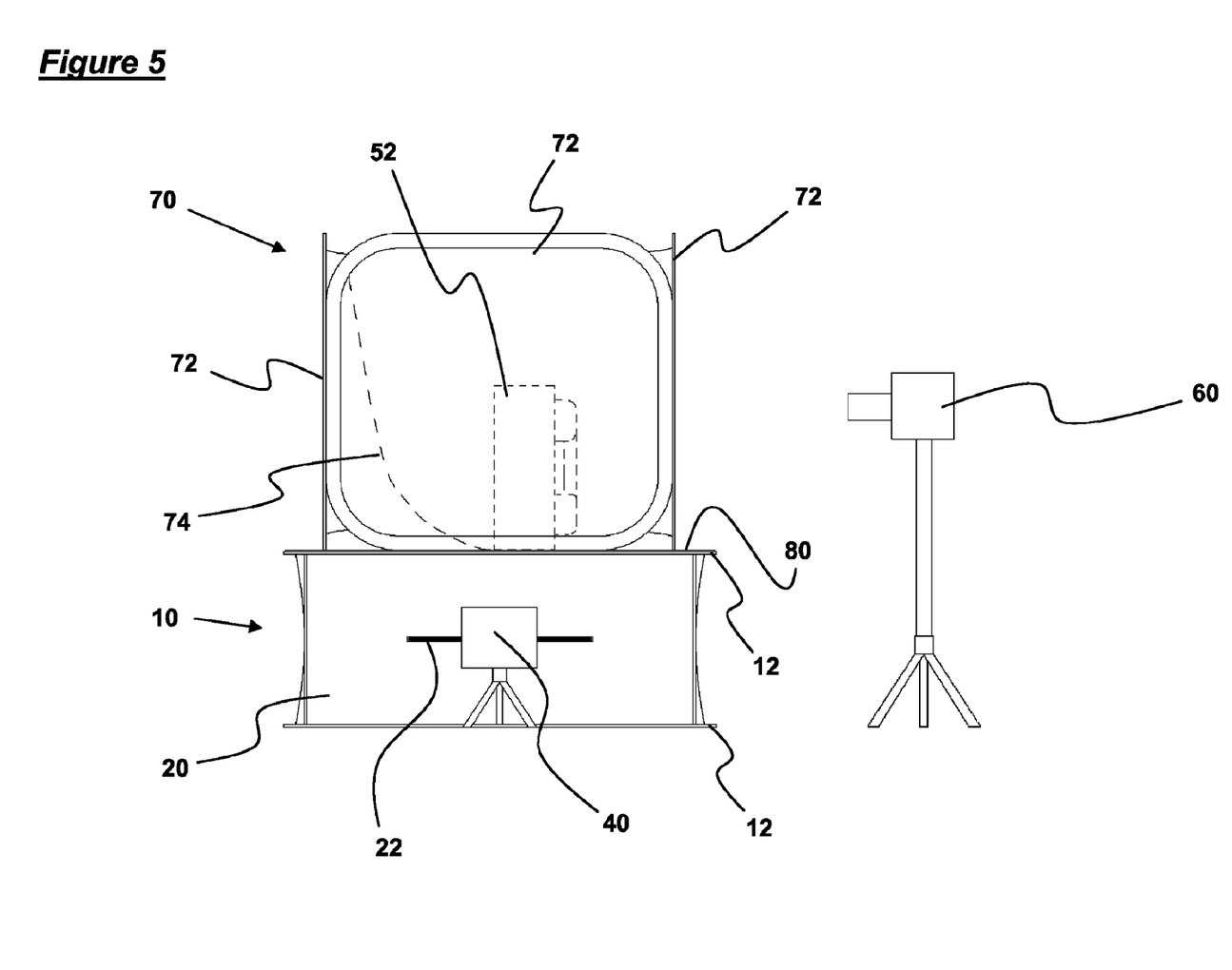
FIG. 5 is a side view, showing some hidden detail, of a second embodiment of apparatus according to the invention, in which a consumer product is being photographed.
Figure 6:
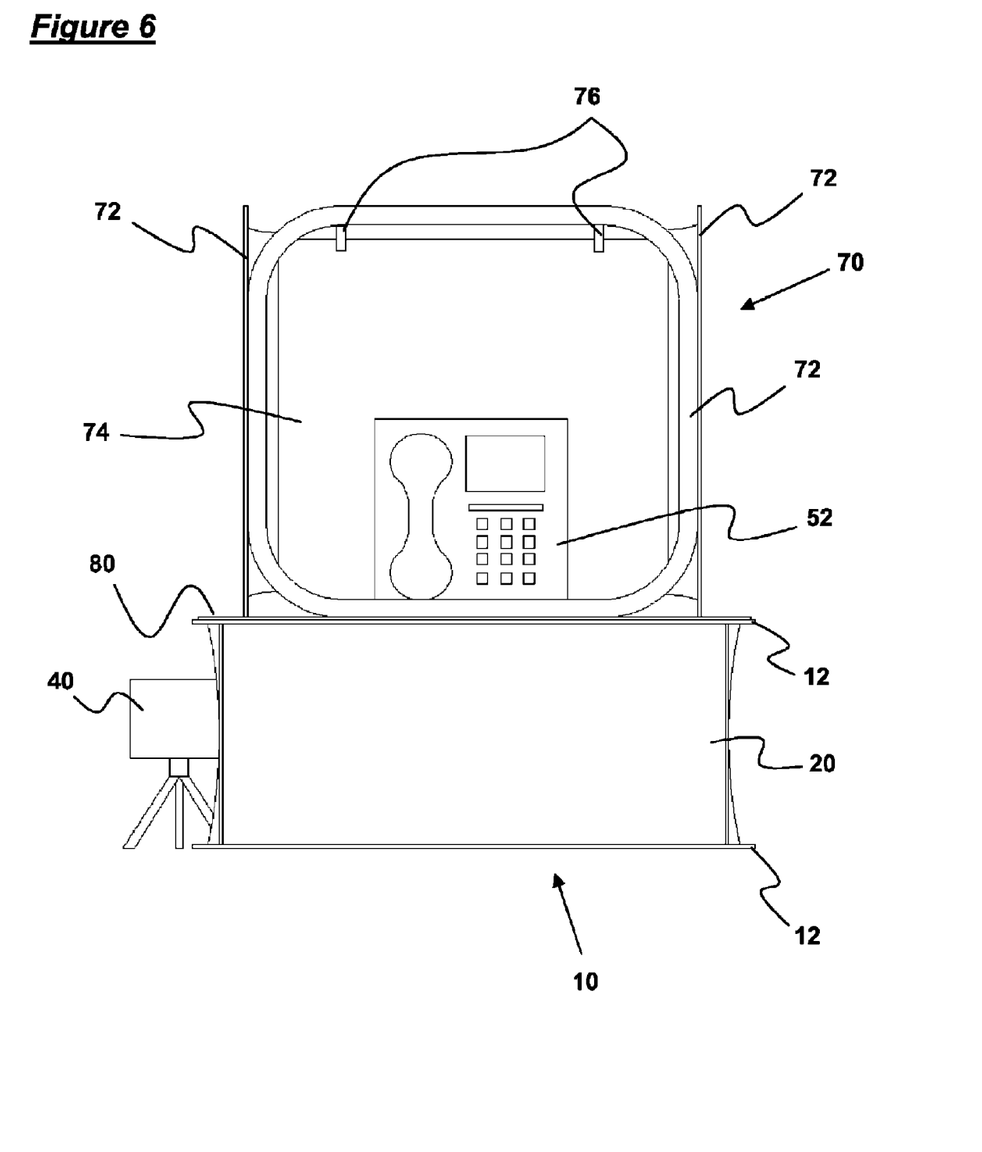
FIG. 6 is a front view of the apparatus of FIG. 5.

Referring now to FIGS. 5 and 6, a second embodiment of apparatus according to the invention is shown. The apparatus comprises the background unit 10 described above, a rigid platform 80, a light source 40, a photographic camera 60 and a housing 70.

The background unit 10 rests upon the substantially opaque panel 12 so that both panels 12 are orientated horizontally, and the opening 22 is situated on one side of the background unit 10. The light source 40 is arranged so that light is directed through the opening 22 into the interior of the background unit 10. In particular, the light source 40 is arranged so that light is directed principally towards the interior surfaces of the connecting web 20 and the opaque panel 12.

The rigid platform 80 is formed of a sheet of transparent plastics material, and is shaped and dimensioned so as to be received with an interference fit within the resilient hoop 16 and associated fabric tube 14 of the upper panel 12, and rests upon the upper surface of the fabric of that panel 12. The housing 70 rests upon the rigid platform 80.

The housing 70 comprises four panels 72 that are similar in structure to the panels 12 of the background unit 10, but with a front panel 72 having only a frame and hence defining an opening into the housing 70. These four panels 72 are connected at their vertical edges by flexible webs so as to form a generally cuboidal arrangement. The housing 70 has an open base, but a sheet of flexible translucent material extends between the upper edges of the panels 72 so as to form an upper wall for the housing 70. In addition, a pair of crocodile clips 76 are provided within the housing 70 at the rear of the upper wall, as shown in FIG. 6. A flexible sheet of translucent plastics material 74 is suspended from the crocodile clips 76, and extends along a curved path to the lower edge of the front panel 72, such that when viewed through the open front panel 72 of the housing 70 the translucent sheet 74 is generally concave in form.

The subject 52 of the photograph to be taken, which in the illustrated case is a telephone, is positioned on the upper surface of the translucent sheet 74 at the base of the housing 72, as shown in FIG. 5. The camera 60 is then arranged so that the translucent sheet 74 forms the background of the photograph to be taken. Once again, the intensity of the light emitted by the light source 40 needs to be sufficient for the translucent sheet 74 to be illuminated by the illuminating wall 18 of the upper panel 12 to such an extent, relative to the exposure settings of the camera 60, that the translucent sheet 74 is over-exposed in the photograph. Additional light sources (not shown in the Figures) may also be used to direct light through the walls of the housing 70 to illuminate the subject 52 itself. Once the photographer is happy that the translucent sheet 74 is sufficiently over-exposed and the subject 52 is appropriately illuminated, a photograph is taken by the camera 60.

When the apparatus is no longer required, the housing 70 may be collapsed and then stowed in a pouch or other receptacle until it is next required. In particular, in order to collapse the housing 70, the panels 72 are folded so as to lie on top of one another, and opposite sides of the folded panels 72 are then grasped and twisted to form loops which can then be folded over. Furthermore, the background unit 10 may be collapsed by removing the support struts 30, as described in more detail above.

Figure 7:
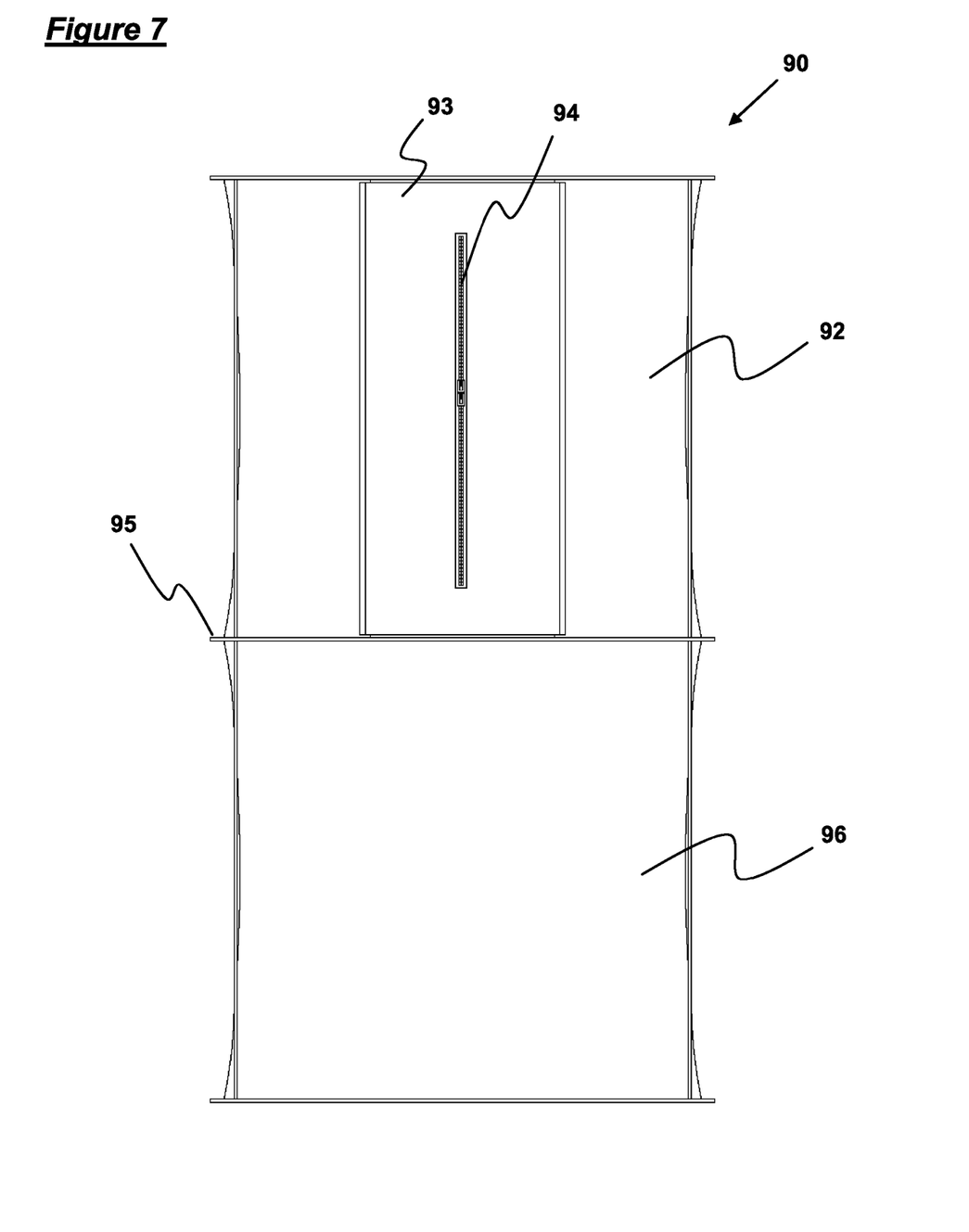
FIG. 7 is a front view of a second embodiment of a background unit according to the invention, in its erected configuration, that incorporates a housing for the object to be photographed and forms part of a third embodiment of apparatus according to the invention.
Figure 8:
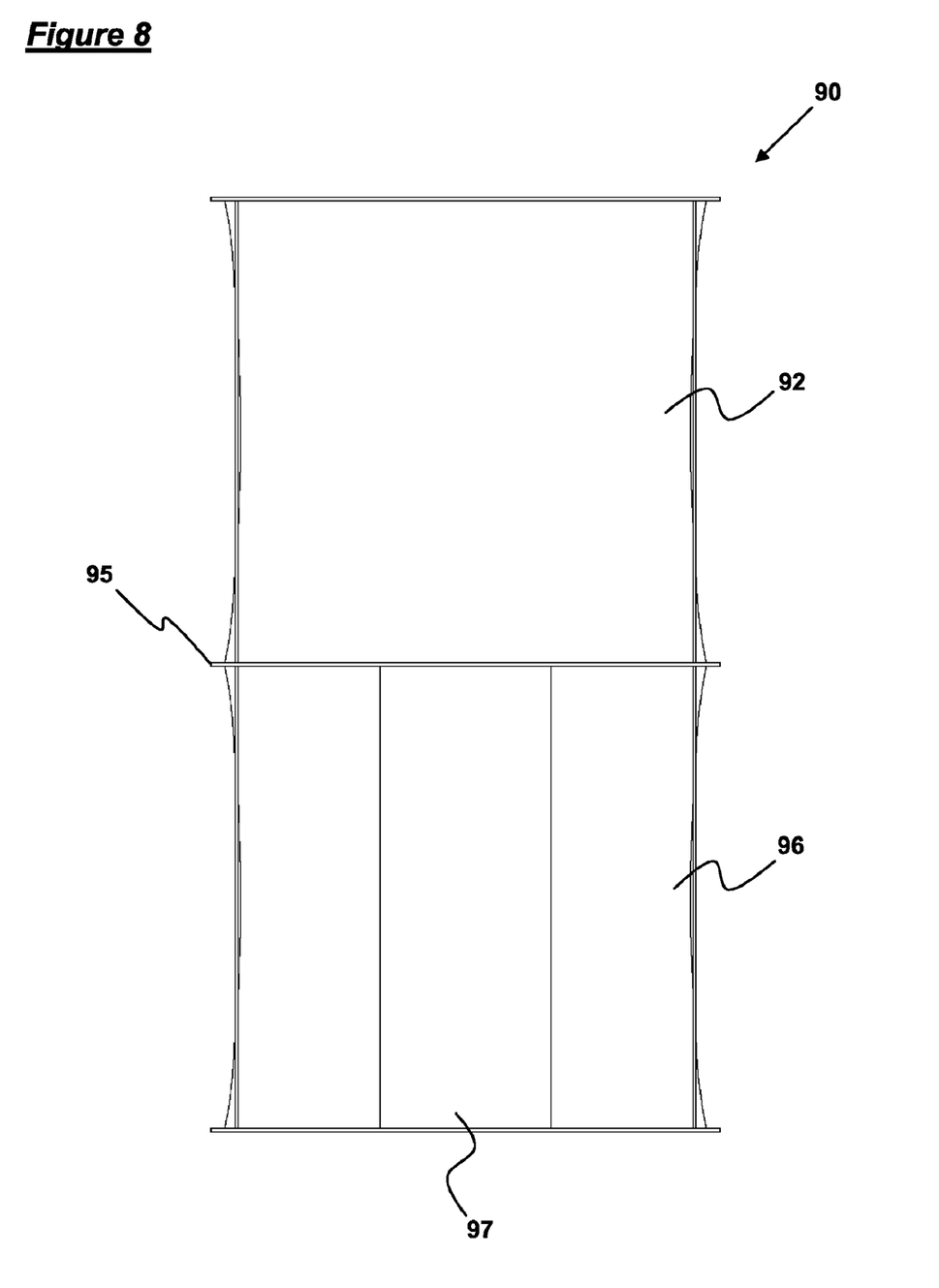
FIG. 8 is a rear view of the background unit of FIG. 7.

FIGS. 7 and 8 show a second embodiment of a background unit according to the invention, which is generally designated 90 and forms part of a third embodiment of the apparatus according to the invention. The third embodiment of the apparatus according to the invention is similar to the second embodiment shown in FIGS. 5 and 6, but comprises the background unit 90 that is shown in FIGS. 7 and 8 in place of the background unit 10 and the housing 70 of the second embodiment.

The background unit 90 comprises a housing 92 and an illuminating enclosure 96. The housing 92 and the illuminating enclosure 96 each comprise upper and lower panels, a connecting web, and support struts, and hence are both of similar construction to the background unit 10 shown in FIG. 1. However, the housing 92 and the illuminating enclosure 96 are arranged such that a single central panel 95 constitutes both the lower panel of the housing 92 and the upper panel of the illuminating enclosure 96. In addition, in order to provide the background unit 90 with sufficient strength to support the object to be photographed, the resilient hoop of each panel is of greater thickness than the resilient hoops of the background unit 10 of FIG. 1. Furthermore, a rigid platform (not visible in FIGS. 7 and 8), which is identical to the rigid platform 80 of the apparatus of FIGS. 5 and 6, is received with an interference fit within the resilient hoop and associated fabric tube of the central panel 95, and rests upon the upper surface of the fabric of that panel 95.

As shown in FIG. 7, the housing 92 includes an opening in a front surface of its connecting web, and a removable closure 93 for that opening. Co-operating strips of hook-and-loop fasteners are provided on a part of the connecting web that is adjacent to the opening, and also the peripheral portions of the closure 93, so that the closure 93 may be releasably secured across the opening. In addition, the closure 93 is formed with an opening that has the form of a slit in the fabric of the closure 93 and is orientated vertically along a centre line of the closure 93. The opening in the closure 93 is variable in size by means of a zip closure 93 that is closable from either end of the opening by means of a pair of zips.

Although not visible in FIG. 7, the housing 92 also includes a translucent sheet that is arranged in an identical manner to the translucent sheet 74 of the housing 70 of the second embodiment. In particular, a flexible sheet of translucent plastics material is suspended within the housing 92 by means of crocodile clips situated at the rear of the upper wall of the housing 92. The translucent sheet extends along a curved path to a lower front edge of the housing 92, such that when viewed through the opening in the housing 92, or the opening in the closure 93, the translucent sheet is generally concave in form. As shown in FIG. 8, the illuminating enclosure 96 includes an opening 97 in a rear surface of its connecting web.

As discussed above, the third embodiment of the apparatus according to the invention is similar to the second embodiment shown in FIGS. 5 and 6, but comprises the background unit 90 shown in FIGS. 7 and 8 in place of the illuminating enclosure 10 and the housing 70 shown in FIGS. 5 and 6. The light source is therefore arranged so that light is directed through the opening 97 into the interior of the illuminating enclosure 96. The subject of the photograph to be taken is positioned on the upper surface of the translucent sheet at the base of the housing 92.

The camera may then be arranged so that the closure 93 is disengaged from the housing 92 and the subject is visible to the camera through the opening in the connecting web of the housing 92. Alternatively, the closure 93 may be engaged with the housing 92 so that the subject is only visible to the camera through the opening in the closure 93. This will generally involve the lens portion of the camera projecting through the opening in the closure 93. The zip closure 94 would then be adjusted so that the opening is closed as much as possible whilst still enabling a photograph to be taken.

Furthermore, the camera is arranged so that the translucent sheet forms the background of the photograph to be taken. The intensity of the light emitted by the light source needs to be sufficient for the translucent sheet to be illuminated by the illuminating wall of the central panel 95 to such an extent, relative to the exposure settings of the camera, that the translucent sheet is over-exposed in the photograph. Additional light sources (not shown in the Figures) will also need to be used to direct light through the walls of the housing 92 to illuminate the subject itself. Once the photographer is happy that the translucent sheet is sufficiently over-exposed and the subject is appropriately illuminated, a photograph is taken by the camera.

When the background unit 90 is no longer needed, it can be collapsed by removing the support struts. In particular, the support struts are removed by increasing the separation of the panels slightly, and hence causing additional stretching of the fabric of the connecting webs, and then removing the resilient hoops from the notches of the support struts. Once the support struts have been disengaged from the panels, the background unit 90 may be collapsed into a configuration in which the panels and the rigid platform lie alongside one another, with the connecting webs folded between the panels.

The invention claimed is:

1. A collapsible background unit for use in association with a light source and a camera for photographing an object,
    the collapsible background unit comprising an enclosure with an illuminating wall that is translucent,
    the arrangement being such that when light from a light source is directed into the interior of the enclosure the illuminating wall transmits at least some of said light to the exterior of the enclosure, such that the illuminating wall, or an additional translucent component interposed between the illuminating wall and the object, constitutes a background for the object,
    wherein the collapsible background unit includes first and second panels, each panel comprising a sheet of flexible material mounted in a resilient frame and being adapted to maintain its shape during normal use,
    the first and second panels being connected by a web of flexible material that extends between the frames of the first and second panels, and
    the connecting web being held in tension by a plurality of removable support struts that extend between the panels, the support struts being situated externally of the connecting web.

2. A collapsible background unit as claimed in claim 1, wherein the background unit is adapted to be free-standing in an upright configuration, in which the illuminating wall is capable of constituting a background for the object.

3. An apparatus for photographing an object, the apparatus comprising a camera, a collapsible background unit as defined by claim 1, and a light source arranged relative to the background unit so that light from the light source is directed into the interior of the enclosure, the illuminating wall being adapted to transmit at least some of said light to the exterior of the enclosure, and the camera and the object being arranged externally of the enclosure such that the illuminating wall, or an additional translucent component interposed between the illuminating wall and the object, constitutes a background for the object.

4. The apparatus as claimed in claim 3, wherein the enclosure is adapted to receive light from the light source through an opening in a wall of the enclosure.

5. The apparatus as claimed in claim 4, wherein the opening includes a closure that enables the size of the opening to be altered.

6. The apparatus as claimed in claim 4 wherein the illuminating wall is illuminated principally by light that has been reflected by the interior surface of the enclosure.

7. The apparatus as claimed in claim 3, wherein the interior surface of the enclosure is adapted to reflect at least a portion of the light directed into the interior of the enclosure by the light source, so that said light is reflected about the interior of the enclosure before being transmitted through the illuminating wall.

8. The apparatus as claimed in claim 7, wherein the background unit forms a support for the object.

9. The apparatus as claimed in claim 7, wherein a housing for providing featureless surroundings for the object is provided, the housing being arranged so as to surround the object, but including a front opening through which a photograph is taken.

10. The apparatus as claimed in claim 3, wherein the illuminating wall is situated beneath the object to be photographed.

11. The apparatus as claimed in claim 1, wherein the object is positioned directly in front of the illuminating wall, externally of the enclosure, such that the illuminating wall forms a background for the object being photographed.

12. A method of photographing an object, which method comprises the steps of
    (a) providing a camera, a light source and a collapsible background unit as defined by claim 1,
    (b) arranging the light source and the background unit relative to each other so that light from the light source is directed into the interior of the enclosure, at least some of said light being transmitted to the exterior of the enclosure through the illuminating wall,
    (c) arranging the object and the camera externally of the enclosure such that the illuminating wall, or an additional translucent component interposed between the illuminating wall and the object, constitutes a background for the object, and
    (d) taking a photograph of the object using the camera.

13. A method as claimed in claim 12, wherein the light transmitted through the illuminating wall is of sufficient intensity relative to the exposure settings of the camera for the transmitted light to be over-exposed in the photograph.

14. A method as claimed in claim 12, wherein the background unit is positioned on a suitable surface in a free-standing configuration.

15. An apparatus for photographing an object, the apparatus comprising a camera,
    a collapsible background unit comprising an enclosure with an illuminating wall that is translucent, such that the illuminating wall, or an additional translucent component interposed between the illuminating wall and the object, constitutes a background for the object, wherein the collapsible background unit includes first and second panels, each panel comprising a sheet of flexible material mounted in a resilient frame and being adapted to maintain its shape during normal use, the first and second panels being connected by a web of flexible material that extends between the frames of the first and second panels, and the connecting web being held in tension by a plurality of removable support struts that extend between the panels, the support struts being situated externally of the connecting web, and
    a light source arranged relative to the background unit so that light from the light source is directed into the interior of the enclosure, the illuminating wall being adapted to transmit at least some of said light to the exterior of the enclosure, and the camera and the object being arranged externally of the enclosure,
    wherein the object is positioned directly in front of the illuminating wall, such that the illuminating wall forms a background for the object being photographed.

16. The apparatus as claimed in claim 15, wherein the collapsible background unit includes the housing for providing featureless surroundings for the object.

17. A collapsible background unit for use in association with a light source and a camera for photographing an object,
    the collapsible background unit comprising an enclosure with an illuminating wall that is translucent,
    the arrangement being such that when light from a light source is directed into the interior of the enclosure the illuminating wall transmits at least some of said light to the exterior of the enclosure, such that the illuminating wall, or an additional translucent component interposed between the illuminating wall and the object, constitutes a background for the object, wherein the background unit is adapted to form a support for the object being photographed, such that the illuminating wall is situated beneath the object during use.

* * * * *